United States Patent
Salter et al.

(10) Patent No.: US 11,988,525 B2
(45) Date of Patent: May 21, 2024

(54) AUTONOMOUS VEHICLE WITH AUTOMATED FOLLOWING OF PERSON OUTSIDE VEHICLE

(71) Applicant: FORD GLOBAL TECHNOLOGIES, LLC, Dearborn, MI (US)

(72) Inventors: Stuart C. Salter, White Lake, MI (US); Brendan F. Diamond, Grosse Pointe, MI (US); Marguerite Kimball, Brighton, MI (US); Annette L. Huebner, Highland, MI (US); John R. Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 17/678,381

(22) Filed: Feb. 23, 2022

(65) Prior Publication Data
US 2023/0266145 A1 Aug. 24, 2023

(51) Int. Cl.
  *G01C 21/00* (2006.01)
  *B60W 60/00* (2020.01)
  *G06V 20/58* (2022.01)

(52) U.S. Cl.
  CPC ......... *G01C 21/387* (2020.08); *B60W 60/001* (2020.02); *G06V 20/58* (2022.01); *B60W 2554/4041* (2020.02)

(58) Field of Classification Search
  CPC .............. G01C 21/387; B60W 60/001; B60W 2554/4041; G06V 20/58
  See application file for complete search history.

(56) References Cited

U.S. PATENT DOCUMENTS

| | | | |
|---|---|---|---|
| 6,112,143 A | 8/2000 | Allen et al. | |
| 8,989,972 B2 | 3/2015 | Anderson | |
| 10,962,971 B2 | 3/2021 | Doane et al. | |
| 2015/0025708 A1* | 1/2015 | Anderson | G01S 13/867 340/463 |
| 2017/0368691 A1* | 12/2017 | Li | G05D 1/0221 |
| 2018/0341264 A1 | 11/2018 | Knych | |

(Continued)

FOREIGN PATENT DOCUMENTS

KR 20190035376 * 4/2019

OTHER PUBLICATIONS

Machine Translation of KR 20190035376 (Year: 2019).*

*Primary Examiner* — Anne Marie Antonucci
*Assistant Examiner* — Jordan T Smith
(74) *Attorney, Agent, or Firm* — Frank L. Lollo; MacMillan, Sobanski & Todd, LLC (57) ABSTRACT

An autonomous vehicle operates in a Follow Mode, wherein an apparatus for controlling movement of a vehicle includes an exterior monitoring system comprising at least one sensor to monitor an exterior region and to detect a location of a target user. A controller is configured to A) interactively map an activity zone having a selected expanse in the exterior region relative to the vehicle, B) compare a monitored location of the target user to the activity zone, C) detect a relocation event when the comparison of the monitored location of the target user to the activity zone exceeds a predetermined deviation, and D) send a navigation command in response to detecting the relocation event in order to autonomously reposition the vehicle so that a relative location of the target user is restored to the activity zone.

20 Claims, 5 Drawing Sheets

(56) References Cited

U.S. PATENT DOCUMENTS

| | | |
|---|---|---|
| 2020/0241558 A1 | 7/2020 | Tseng |
| 2022/0032796 A1 | 2/2022 | Salter et al. |
| 2023/0062175 A1* | 3/2023 | Yahata .................. G08B 25/04 |

* cited by examiner

AUTONOMOUS VEHICLE WITH AUTOMATED FOLLOWING OF PERSON OUTSIDE VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to autonomously operated motor vehicles, and, more specifically, to a Follow Mode which maintains a desired positioning of the vehicle alongside a user as the user walks or otherwise moves about outside of the vehicle.

An autonomous transportation vehicle such as a car or pickup truck may operate in a "follow mode" in which the vehicle drives automatically in sync with a user located outside the vehicle. For example, a person working on a fence line by moving from post to post could benefit from using tools and parts out of a storage area (e.g., truck bed) of a vehicle which automatically follows along the fence line as work progresses. An autonomous vehicle could also follow gas meter readers as they go from house to house. A person going out for a walk could be followed by the autonomous vehicle in order to be driven back home at the end of the walk. As mentioned in US patent publication 2022/0032796A1, an autonomous vehicle may supply a source of electrical power via a cable connection between the vehicle and a portable power tool. Wireless power transfer could also be utilized wherein power tools or other electrical devices being manipulated or carried by the user are supplied with power (e.g., wirelessly charging a user's cellular phone while taking a walk).

Vehicles operating in a follow mode have provided limited options for tracking alongside a user. In U.S. Pat. No. 8,989,972 for example, as long as a path parallel to the user is passable (e.g., provides a drivable surface without obstructions) then a waste collection vehicle continuously adjusts its position to keep the user at the side of the vehicle. In many situations, however, progress of a user along a particular path may not be linear or unidirectional. There may be times of significant user motion during which it is not desired for the vehicle to be automatically repositioned. A rigid tracking relationship may be unsatisfactory to a user for a wide variety of the potential tasks or uses for which the user wishes to use a follow mode.

SUMMARY OF THE INVENTION

In one aspect of the invention, an apparatus for controlling movement of a vehicle comprises an exterior monitoring system comprising at least one sensor to monitor an exterior region and to detect a location of a target user. A controller is configured to A) interactively map an activity zone having a selected expanse in the exterior region relative to the vehicle, B) compare a monitored location of the target user to the activity zone, C) detect a relocation event when the comparison of the monitored location of the target user to the activity zone exceeds a predetermined deviation, and D) send a navigation command in response to detecting the relocation event in order to autonomously reposition the vehicle so that a relative location of the target user is restored to the activity zone.

DETAILED DESCRIPTION OF PREFERRED EMBODIMENTS

In some embodiments of the invention, a Follow Mode (i.e., Follow The Leader Mode) is provided for an autonomous vehicle using an already existing sensor suite utilized by the autonomous functions to track a location of a leader (i.e., target user) relative to a virtual perimeter that can be customized according to a task to be performed. The vehicle follows the user episodically whenever the user moves outside the perimeter in order to recenter the virtual perimeter on the user. The vehicle can also perform auxiliary functions while following the user such as path lighting, health monitoring, or wireless trickle charging.

The Follow Mode can be initiated manually or can be activated automatically based on a detection by the vehicle that it has entered a predetermined geofenced location and/or that the user is outside the vehicle performing activities corresponding to a predetermined task. For example, if a user is identified as being a fence worker and the vehicle is located proximate to a fence or other known job site as determined by a GPS navigation system or by exterior vehicle cameras, the vehicle may enter the Follow Mode automatically.

The Follow Mode can be controlled such that the vehicle only follows the user on specific terrains and/or public roads. For example, when the vehicle is located next to a busy road, its movement may be limited to keep it off the road by a predetermined distance. If a team of multiple people are working together, a specific individual can be identified as a target or Leader and tracked for purposes of guiding appropriate movement of the vehicle.

The target user may specify which part of the vehicle they need to access while performing the associated task so that the vehicle can automatically retain a desired orientation relative to the user. In some embodiments, the vehicle can use an existing camera or radar sensors to follow in either a hood first or a tailgate first manner. The tailgate-first orientation is beneficial for using tools or materials out of the bed of a truck or truck of a car, for example. Automatically maintaining a desired orientation relative to the target user means that the moving vehicle will park itself at a specific angle which helps ensure easy accessibility to the tools and materials. The desired orientation can be manually selected by identifying a desired closure (e.g., vehicle door or liftgate) or storage compartment. In some embodiments, a closure can be automatically selected based on detecting an opened state of the closure when the Follow Mode is initiated.

Based on a target user's job requirements, an appropriately sized virtual perimeter may be automatically generated by a controller in the vehicle, in a user's mobile device (e.g., smartphone), or by the two operating together. For example, the perimeter may define an activity zone for which a corresponding boundary size and shape are predefined according to the typical movements associated with a particular identified task (e.g., an oval shaped activity zone alongside the vehicle for a user engaged in landscaping work). The activity zone perimeter may be created on a smartphone touchscreen using a smartphone app (e.g., the Ford Pass™ mobility app) based on direct user input. In some embodiments, the perimeter size/shape is automatically generated based on vehicle detection of the movement, gestures, or task being performed of a user (i.e., leader) or based on detection of an object (e.g., tool) being held by the user. For example, if the vehicle recognizes the user is building a fence and needs a constant supply of wood or nails and access to a hammer, then a corresponding shape/size of the activity zone is selected. The shape and size of a predetermined perimeter may be adapted to allow for expected patterns of movement by the user without unnecessary vehicle movement.

During operation of the Follow Mode, a vehicle controller may monitor the target user's current location and then map a virtual perimeter around the current location. An existing sensor suite (e.g., optical cameras, radar, LIDAR, etc.) which is already available for autonomous driving control or other functions can be used to determine the relative orientation of the leader to the virtual perimeter mapped around the target user. The vehicle controller may estimate the user's trajectory and time (e.g., elapsed time or aggregate time) outside of the activity zone perimeter to determine whether the vehicle needs to reposition itself. Preferred time delays can be selected by the user such that the vehicle briefly remains motionless to wait for the user to re-enter the virtual perimeter before vehicle movement is taken. If needed, the vehicle may use fully autonomous (i.e., unmanned) driving or semi-autonomous driving to move the vehicle in a way that repositions a center of the virtual activity zone perimeter to a new location at a time-averaged location of the target user (e.g., an average measured over the time since they exited the activity zone). In some embodiments, when the user continues to move at a steady pace then the vehicle may continue to match the trajectory of the target user until they stop at a location for more than a predetermined time period. When in "Follow Mode," the system may utilize different tones or sounds to signify that the vehicle is moving forward or backward. Such custom sounds may be generated and feed to exterior front or rear speakers typically fitted on battery electric vehicles (BEV) that are too quiet to be heard when in very slow motion.

Figure 1:
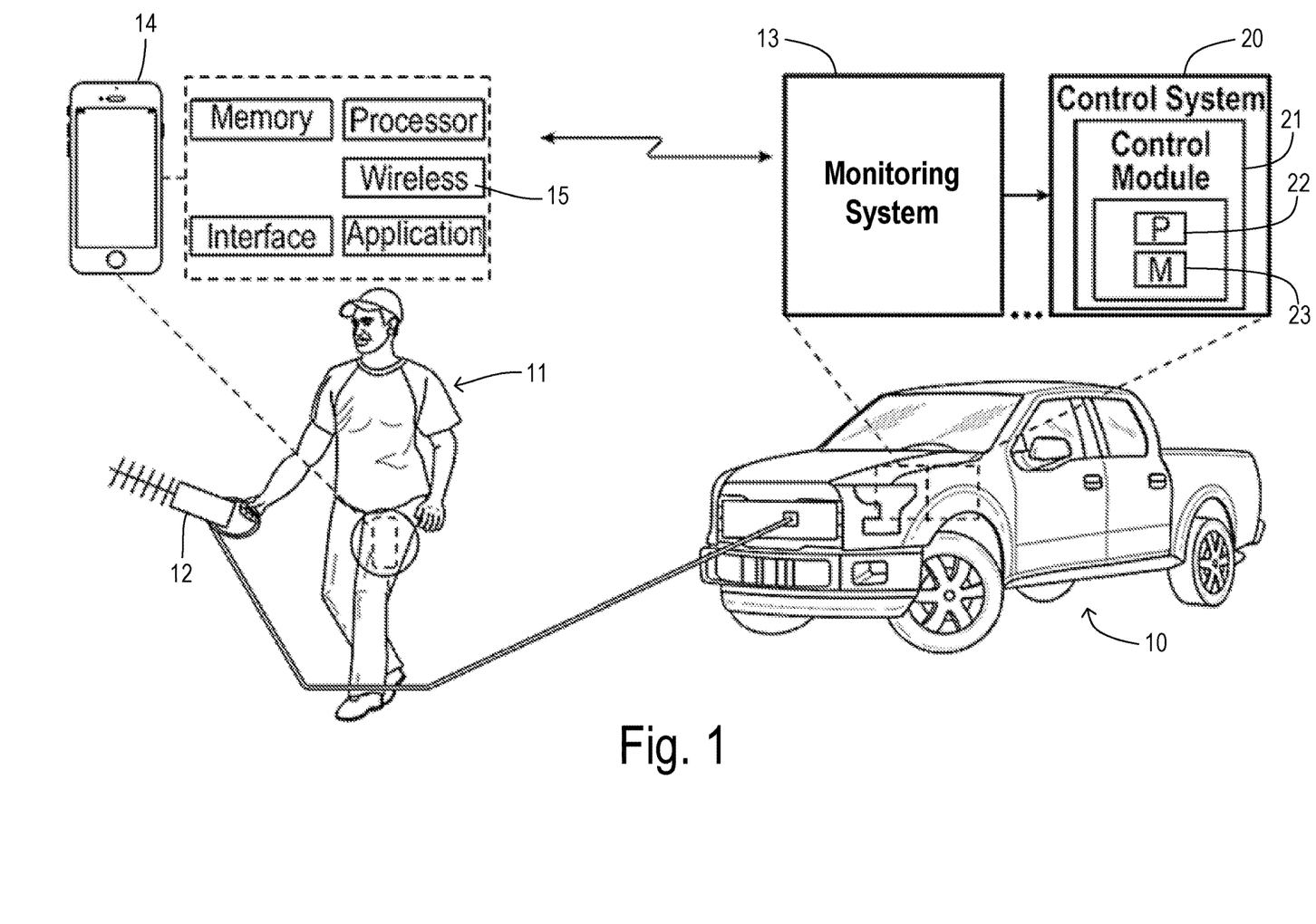
FIG. 1 schematically depicts a user and a vehicle operating in a Follow Mode in cooperation with a wireless mobile device.

Referring to FIG. 1, a "Follow Mode" is configured to enable a vehicle 10 to autonomously follow the movement of a target user 11 with an electrically powered device 12 (e.g., a powered lawn tool or any other powered equipment). Device 12 may be plugged into a portable power system of vehicle 10. Alternatively, power can be delivered wirelessly to device 12 (e.g., using commercially available systems such as the Cota® power delivery system from Ossia, Inc. of Redmond, Washington). Further, power may be provided from a gas motor in the tool and portable refueling tanks may be available in the bed of the following vehicle. Vehicle 10 includes a monitoring system 13 configured to track the movement of user 11. Monitoring system 13 may communicate with a mobile device 14 (e.g., a smartphone, tablet, computer, wearable smart device, etc.) which may belong to target user 11.

Monitoring system 13 may include remote sensing devices (e.g., cameras, radars, LIDARs, ultrasonic proximity sensors, capacitive sensors, etc.) and/or one or more wireless devices (e.g., Ultra Wide Band (UWB) locator tags and/or Bluetooth® transceivers) that facilitate the detection of, and the proximity to, target user 11 and/or mobile device 14. Remote sensing devices may be imbedded or otherwise mounted at various locations of vehicle 10. In some embodiments, wireless tracking devices are comprised of Bluetooth® Low Energy (BLE) transceivers configured to receive and/or emit low energy Bluetooth® signals for determining the proximity of user 11 via mobile device 14. Mobile device 14 may include a GPS receiver (not shown) for determining its geographic coordinates, which can be used to a control system 20 in vehicle 10 to determine a relative position of user 11 by comparing those coordinates to the coordinates of vehicle 10 which may be obtained from a GPS receiver (not shown) mounted in vehicle 10, for example. Remote sensing devices within monitoring system 13 may determine the relative position directly.

Mobile device 14 is shown with a wireless transceiver 15 configured to communicate with one or more electronic systems in vehicle 10 such as a control system 20 or monitoring system 13. A wireless connection via transceiver 15 may be a BLE connection, a Wi-Fi connection, or any other type of wireless connection. For example, wireless device 15 of the mobile device 14 may be adapted to periodically broadcast wireless signals that include information pertinent to the current location and/or state of movement of user 11. Based on the wireless signals, monitoring system 13 is configured to determine the approximate distance and direction of movement of user 11 relative to vehicle 10.

Monitoring system 13 is in electrical communication with control system 20, such as over a controller area network (CAN). Based at least in part on the information received from monitoring system 13, control system 20 determines the relative location (e.g., direction and distance) to user 11. For example, control system 20 may utilize a tracking technique (e.g., triangulation) to determine the location and direction of movement of user 11 based on monitoring data from monitoring system 13.

Control system 20 may include a control module 21 configured with executable instructions for interfacing with and commanding operations of various components of vehicle 10. Control module 21 may include a processing unit 22 and non-transitory memory 23 for executing various control strategies or modes of vehicle 10.

Processing unit 22 is configured to execute one or more programs stored in memory 23. A first application program may determine when and how to autonomously move vehicle 10 to follow the movement of user 11 when in a Follow Mode. A second application program may allow user 11 or other persons to employ a user interface for enabling and adjusting the Follow Mode.

Figure 2:
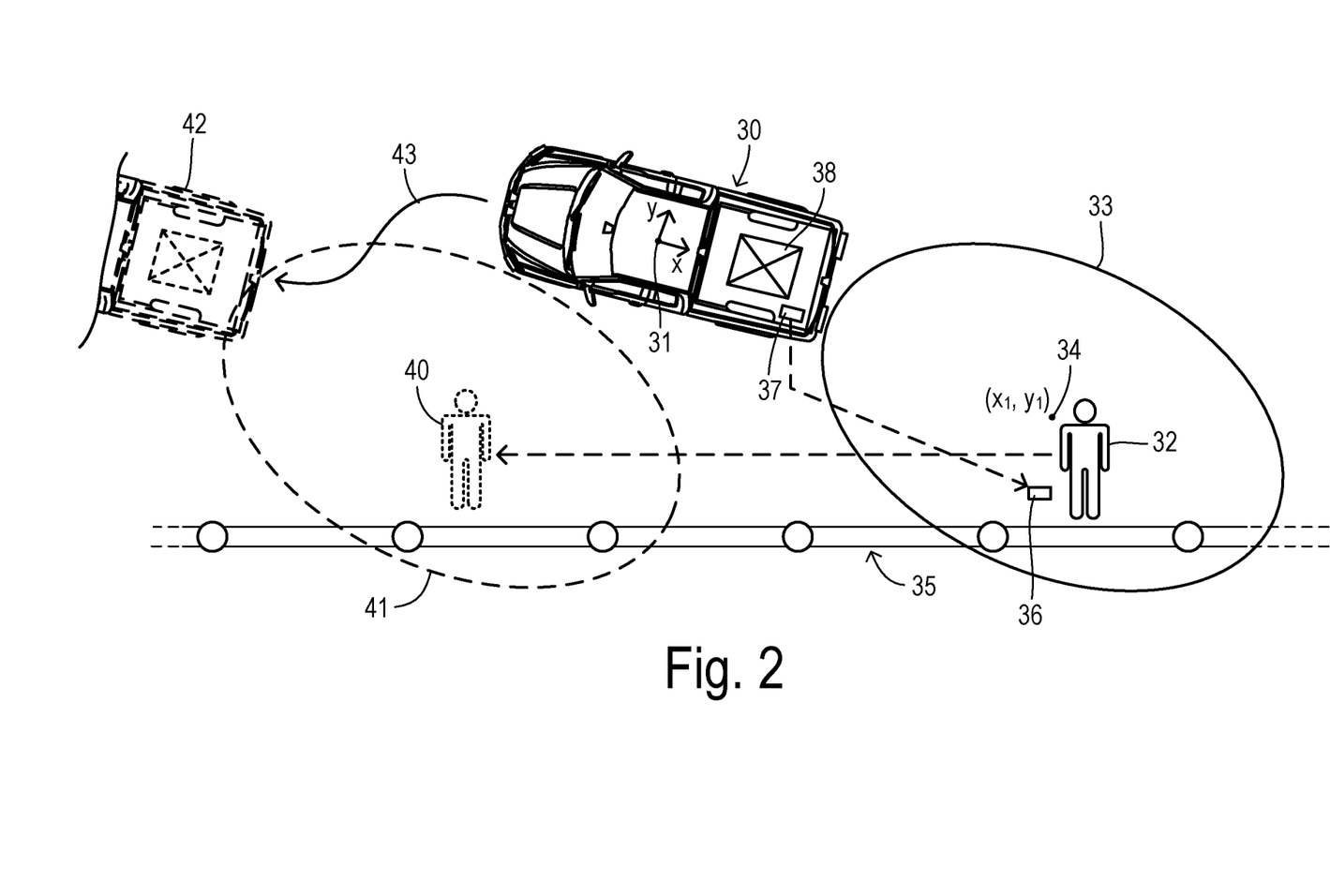
FIG. 2 is a schematic view depicting an autonomous vehicle and a configurable activity zone, wherein the vehicle automatically repositions in certain circumstances so that the activity zone coincides with a location of a user.

The Follow Mode may operate as shown schematically in FIG. 2. A vehicle 30 (e.g., an autonomous, self-driving vehicle) defines a center 31 of a relative coordinate system to keep track of relative locations around vehicle 30 using cartesian [e.g., (x,y)] coordinates or polar [e.g., (r,φ)] coordinates, for example. A target user 32 who is using the Follow Mode is located outside vehicle 30. An activity zone 33 is established having an appropriate size, shape, and/or orientation with respect to vehicle 30 which enables user 32 to move about while performing a task outside of vehicle 30. Activity zone 33 is disposed around a center 34 having relative coordinates $(x_1, y_1)$. The size and placement of activity zone 33 is adapted to performance of tasks by target user 32 while repairing/constructing a fence 35 using an electrically-powered tool 36. In order to provide electrical power to operate and/or recharge tool 36, a wireless power transmitter 37 is mounted in vehicle 30 for transmitting inductive or other wireless signals which are received by tool 36.

The size, shape, and/or orientation of activity zone 33 may be manually selected by target user 32 or may be automatically selected from predetermined activity zone parameters stored in vehicle 30 (e.g., based on a detected type of tool 36, activity patterns of user 32, or known tasks which are normally performed by user 32). In the present invention, user 32 is able to move within activity zone 33 (e.g., along portions of fence 35 and back-and-forth between fence 35 and vehicle 30 to access job materials and/or tools 38) without initiating any corresponding movement of vehicle 30. Even when user 32 deviates from (e.g., wanders outside of) activity zone 33, vehicle movement may be further deferred by a selectable time delay before vehicle 30 reacts. As described in more detail below, when the control module in vehicle 30 detects a "relocation event" then a navigation command is generated to autonomously reposition vehicle 30 to a new position 42 which results in moving activity zone 33 to a new activity zone position 41 to capture a new user location 40.

More specifically, the controller is configured to (i) interactively map activity zone 33 as having a selected expanse in an exterior region relative to vehicle 30, (ii) compare a monitored location of target user 32 to activity zone 33, (iii) detect a relocation event when the comparison exceeds a predetermined deviation, and (iv) send a navigation command in response to detecting the relocation event in order to autonomously reposition vehicle 30 so that relative location 40 of target user 32 is restored to activity zone 33 at new position 41. This capability depends on an exterior monitoring system which may comprise at least one sensor to monitor the exterior region and to detect a location of target user 32.

Figure 3:
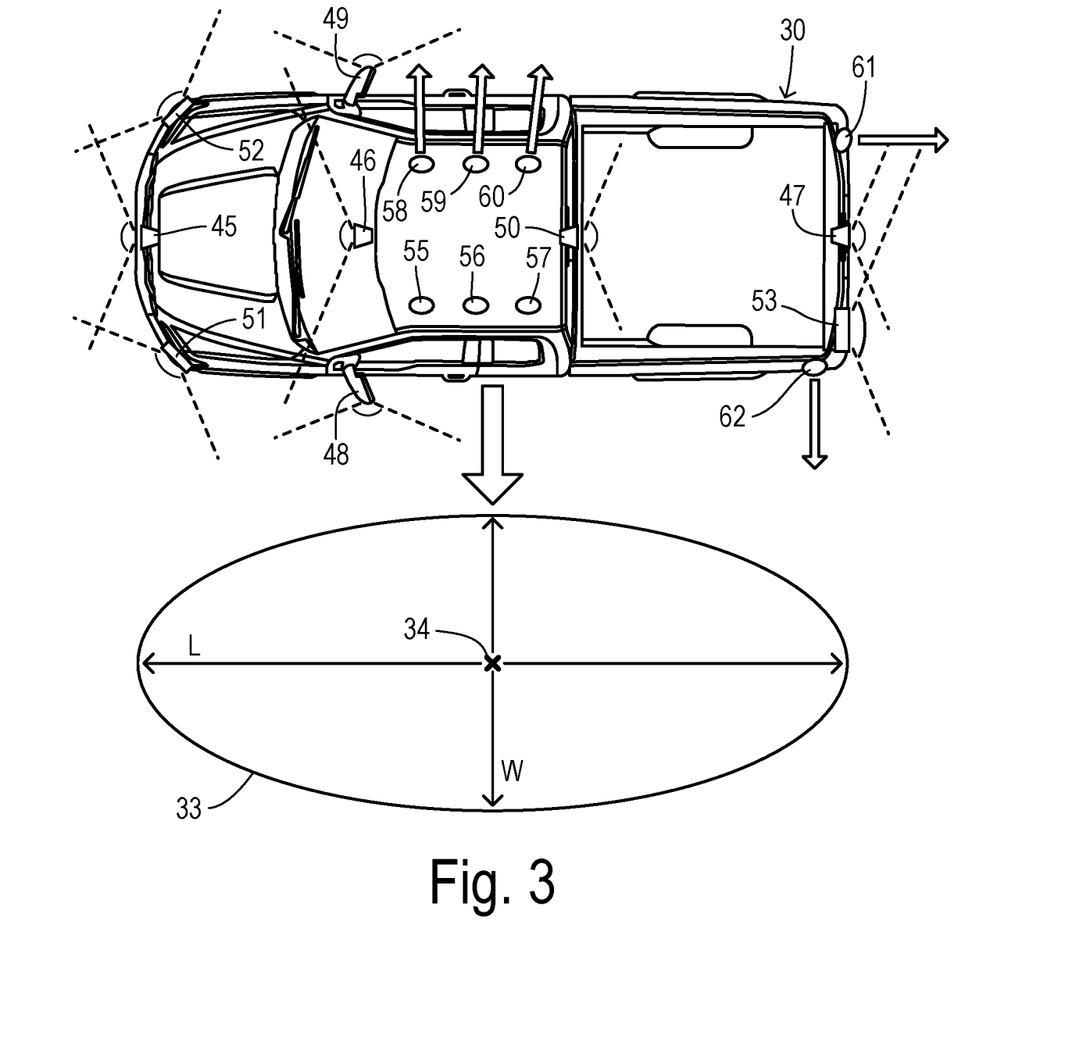
FIG. 3 shows a vehicle with a monitoring system adapted to track a user around an exterior of the vehicle, including a configurable activity zone which can be defined relative to the vehicle.

FIG. 3 depicts vehicle 30 with a plurality of remote sensing devices including cameras 45-50 and radar units 51-53 which are arranged to monitor a full perimeter of vehicle 30 (e.g., as part of a system for performing autonomous driving capabilities). Vehicle 30 may provide auxiliary support functions for the user while in Follow Mode such as wireless power delivery or providing lighting of a work area. Thus, vehicle 30 may also include steerable exterior lighting sources 55-62. Each steerable light source (e.g., a headlamp, backup light, or LED projectors) is adapted to illuminate a selected area outside the vehicle. Steering commands can be generated by the controller in response to monitoring of the target user to determine an area to be illuminated. Light steering can be achieved by selectively activating appropriate ones of a plurality of fixed beam sources or by slewing a light beam from an adjustable light source, for example. As shown in FIG. 3, light sources 55-60 may include fixed spot lights along the sides of a vehicle roof which are aimed in respective directions, while light sources 61 and 62 are incorporated into taillight units. Further, light steering can be accomplished by tracking the phone or Bluetooth® tags attached or embedded in the tools being operated by the user.

Within the monitored perimeter of vehicle 30 established by the monitoring system, activity zone 33 is customizable with various shapes, sizes, and/or orientations to best accommodate movement of the target user when performing a task while in Follow Mode. One typical shape is an oval or ellipse with length axis L and a width axis W through center 34. In some embodiments, the control system may match certain aspects of a current situation (e.g., an identity of the user, a geofenced location of the vehicle, or the presence of certain tools or materials) to a type of task to be performed and the likely patterns of movement that will be conducted by the user, so that the controller can automatically select a predetermined size, shape, placement, and orientation of an activity zone. The matching performed by the control system may utilize pattern matching and/or machine learning models, and the machine learning models can be updated based on behavior patterns of the target user during use. Alternatively, the user can manually configure an activity zone by interacting with the control system through a user interface.

Figure 4:
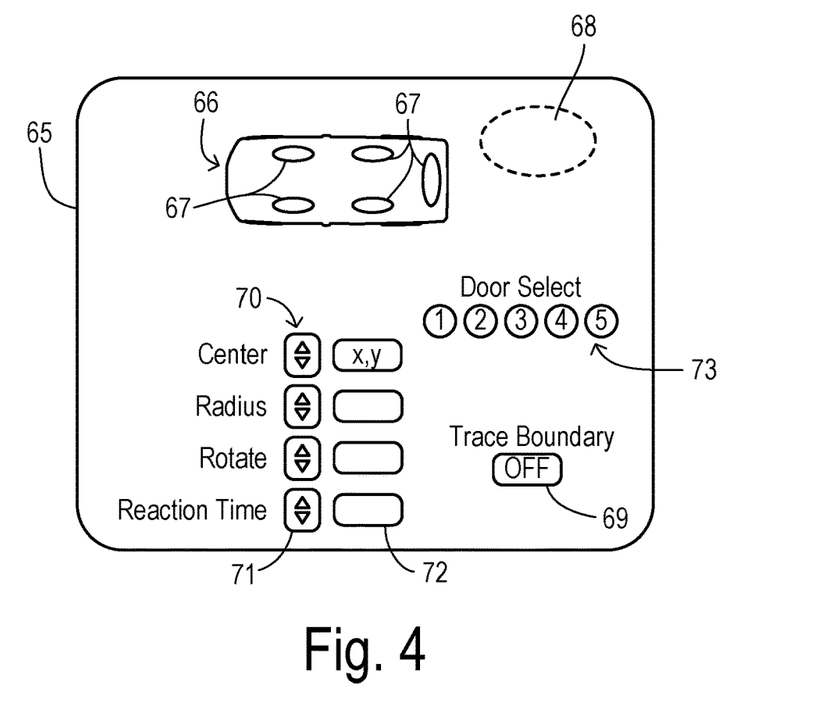
FIG. 4 depicts a touchscreen user interface for interactively mapping an activity zone and for specifying other aspects of a Follow Mode.

A user interface for interacting with the control system may include a touchscreen display on an interior instrument panel of the vehicle and/or a smartphone or other mobile device responsive to touch commands, voice commands, or typed (tapped) messages. FIG. 4 shows contents of a touchscreen display 65 as part of a user interface adapted to collect user defined parameters and transmit them to the control system in order to enable the user to customize an activity zone and the performance of a Follow Mode. Display 65 shows a representation of a vehicle 66 having a plurality of closures 67 (e.g., vehicle access points such as a liftgate and doors). An activity zone graphic 68 depicts a position and size of the activity zone relative to vehicle depiction 66. In some embodiments, zone graphic 68 can be dragged according to size, shape, and/or relative position by sliding a finger on display 65. In some embodiments, a desired layout can be traced on display 65 using finger strokes for tracing the activity zone in relation to displayed vehicle 66 after selecting a "Trace Boundary" icon 69. A plurality of parameter adjustment icons 70 can be provided for scrolling to a desired center location, radius size, and rotation angle for the activity zone (with resulting mounts and an updated activity zone 68 displayed on screen).

The user defined parameters may include an identification of a vehicle access point (i.e., closure or storage compartment such as a truck bed, trunk, or frunk) to be oriented toward the target user. Therefore, a plurality of door select buttons 73 are provided which accept a single door identifier to be manually selected by the user. When a relocation event occurs, the control system determines a destination for the navigation commands that restores a predetermined relationship of a resulting location of the vehicle access point with the activity zone.

In some embodiments, detection of a relocation event depends not solely on the target user exiting the activity zone. Instead, a greater deviation may be required in which the target user stays outside the activity zone for a certain length of time (e.g., to allow for a brief excursion to retrieve a drink of water at a different vehicle door). The length of a time delay may be adjustable by the user. Thus, a reaction time adjustment icon 71 is provided on display 65 to enable the user to lengthen or shorten a selected delay time, with the current setting being shown in a box 72.

In other embodiments, a user interface unit may be comprised of a portable wireless device configured to be carried by the target user. To interactively map the activity zone in the exterior region, the wireless device may be used to signal the controller at selected locations in the exterior region. For example, the wireless device may be used to activate a tracing mode in which the target user walks along a desired perimeter of an activity zone. The vehicle controller can track the target user to detect the configuration of the activity zone using remote sensors or using geographic coordinates that may be continuously sent by the portable device.

Figure 5:
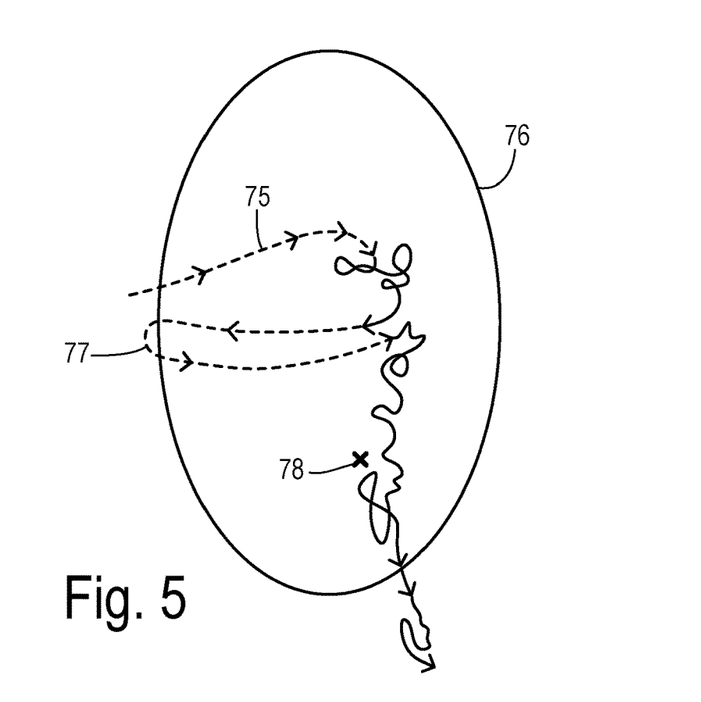
FIG. 5 is a diagram showing a target user's movement over time in relation to a predefined activity zone.

FIG. 5 shows an example of a movement path 75 of a target user relative to an activity zone 76 which is fixed with respect to a stationary location of a vehicle. Path 75 follows a meandering course as the user performs a particular task. A brief deviation 77 from activity zone 76 is less than a predetermined deviation (e.g., is shorter than a predetermined delay time), so that a relocation event is not detected and the vehicle remains stationary. Eventually, path 75 exits activity zone 76 for more than the predetermined deviation and a relocation event is detected. In some embodiments, a target location to be achieved by the navigation commands to be executed by the autonomous vehicle is a location which repositions the activity zone such that the instantaneous location of the target user is placed at the center (or other predetermined spot) of the activity zone.

In some embodiments, a time series of the target user's coordinates along path 75 can be compiled so that an average location can be calculated over predetermined time windows. When a relocation event is recognized, then a time-averaged relative position of the target user can be determined by the control system over a predetermined time window immediately preceding the relocation event. A target location to be achieved by the navigation commands to be executed by the autonomous vehicle can then be a location which repositions the activity zone such that the averaged relative position of the target user is placed at the center (or other predetermined spot) of the activity zone.

Figure 6:
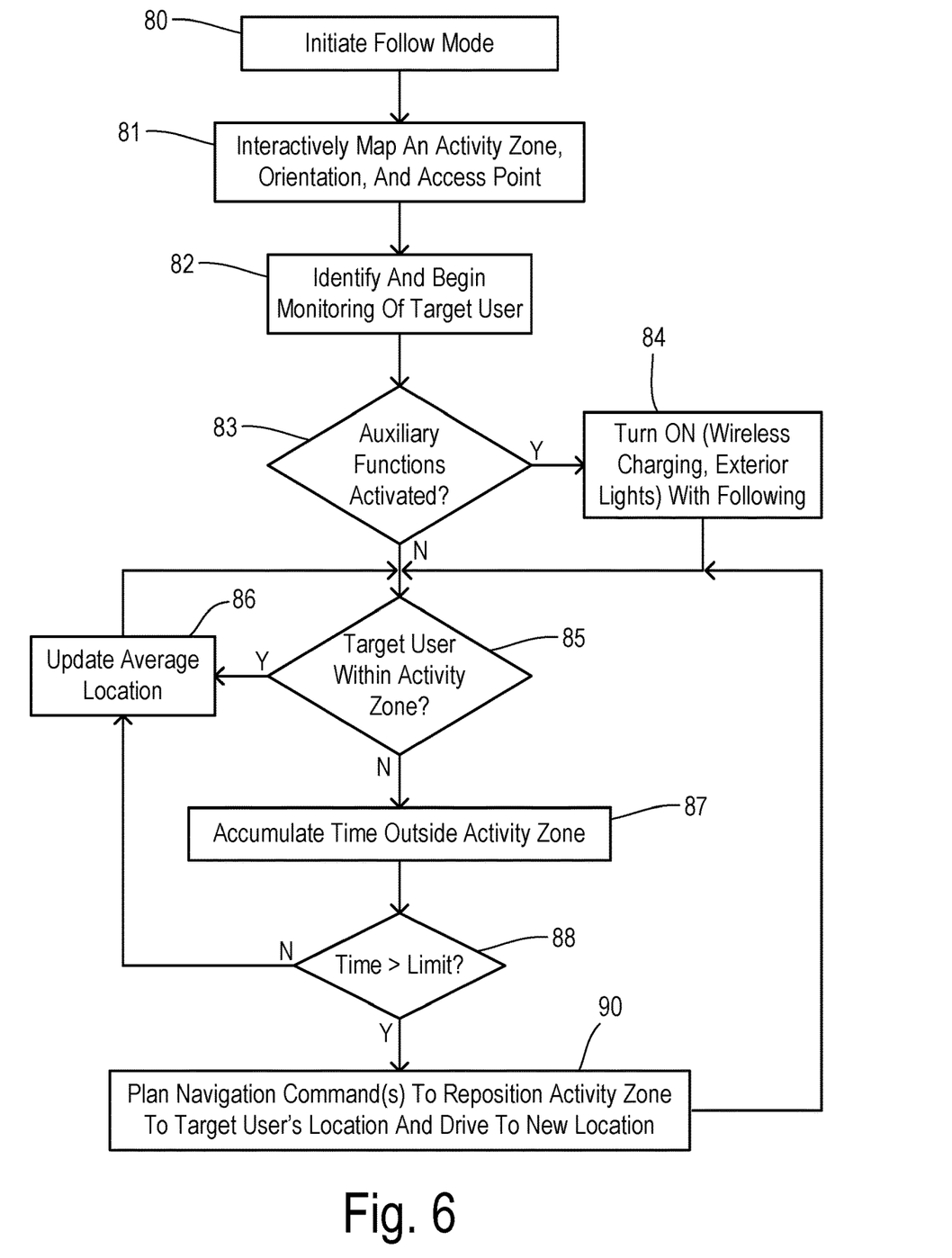
FIG. 6 is a flowchart showing one preferred method of the present invention.

In step 80, follow mode may be initiated manually or automatically based on actions taken by a target user or detection of a vehicle being located in a geofenced region, for example. In step 81, an activity zone (size, shape, and/or orientation) and/or an active access point may be interactively mapped either manually by a user or in response to detected conditions or actions. A monitoring system is used to identify and continuously monitor current locations of the target user in step 82. A check is performed in step 83 to determine whether any auxiliary functions have been activated by the user. If so, then the auxiliary functions are turned on in step 84. Auxiliary functions may include activating a wireless charging system or activating exterior lights, either of which may be executed adaptively so that they follow the instantaneous location of the target user.

Based on the ongoing monitoring of the target user, a check is performed in step 85 to determine whether the target user is still located within the activity zone. If so, then an average location of the user (e.g., calculated over a sliding time window) is updated in step 86. If the target user is detected to be outside the activity zone, then a total time spent outside the activity zone is accumulated in step 87. In step 88, the accumulated time is compared with a predetermined delay time limit, and if the accumulated time is not greater than the predetermined limit than the average location is updated in step 86 and a return is made to continue monitoring whether the target user is still within the activity zone in step 85. If the accumulated time exceeds the predetermined limit, then the method proceeds to step 90 wherein navigation commands are planned which reposition the activity zone onto the target user's current location. Then the navigation commands are executed by the autonomous vehicle in order to drive to the new location, and the method returns to step 85 to continue monitoring for deviations from the activity zone for as long as the Follow Mode remains active.

What is claimed is:

1. Apparatus for controlling movement of a vehicle, comprising:
an exterior monitoring system comprising at least one sensor to monitor an exterior region and to detect a location of a target user;
a controller configured to A) interactively map an activity zone having a selected expanse in the exterior region relative to the vehicle, wherein the activity zone is interactively adapted to a task being performed by the target user by selecting a boundary size and shape for the activity zone according to movements associated with the task, B) compare a monitored location of the target user to the activity zone, C) detect a relocation event when the comparison of the monitored location of the target user to the activity zone exceeds a predetermined deviation, D) send a navigation command in response to detecting the relocation event in order to autonomously reposition the vehicle so that a relative location of the target user is restored to the activity zone, and E) maintain the vehicle stationary when the relocation event is not detected.

2. The apparatus of claim 1 further comprising:
a user interface unit configured to collect a user defined parameter and to transmit the user defined parameter to the controller;
wherein the controller responds to the user defined parameter to map the activity zone.

3. The apparatus of claim 2 wherein the user defined parameter includes an identification of a vehicle access point to be oriented toward the target user.

4. The apparatus of claim 3 wherein the navigation command is configured to provide a predetermined alignment of the vehicle access point toward the target user.

5. The apparatus of claim 2 wherein the user interface unit comprises a touchscreen configured to display a representation of the vehicle and to detect the user defined parameter using finger strokes for tracing the activity zone in relation to the displayed representation of the vehicle.

6. The apparatus of claim 2 wherein the user interface unit is comprised of a portable wireless device configured to be carried by the target user in the exterior region and to signal the controller at selected locations in the exterior region to interactively map the activity zone.

7. The apparatus of claim 1 wherein the predetermined deviation is comprised of the target user being out of the activity zone for more than a predetermined delay time.

8. The apparatus of claim 1 wherein the controller is further configured to F) determine a time-averaged relative position of the target user during a predetermined time window, and G) determine a destination for the navigation command that recenters a current location of the target user to a center of the activity zone.

9. The apparatus of claim 1 wherein the user defined parameter includes an identification of a vehicle access point to be oriented toward the target user, and wherein the controller determines a destination for the navigation command that restores a predetermined relationship of a current location of the vehicle access point with the activity zone.

10. The apparatus of claim 1 wherein the detection of the relocation event occurs after the comparison of the monitored location of the target user to the activity zone exceeds the predetermined deviation for more than a predetermined delay time.

11. The apparatus of claim 1 further comprising:
a steerable light source adapted to illuminate a selected area outside the vehicle in response to steering commands from the controller;
wherein the controller is further configured to generate the steering commands in response to monitoring of the target user by the exterior monitoring system.

12. A method for controlling movement of a vehicle, comprising the steps of:
monitoring an exterior region around the vehicle to detect a location of a target user;
interactively mapping an activity zone having a selected expanse in the exterior region relative to the vehicle, wherein the activity zone is interactively adapted to a task being performed by the target user by selecting a boundary size and shape for the activity zone according to movements associated with the task;
comparing a monitored location of the target user to the activity zone;
detecting a relocation event when the comparison of the monitored location of the target user to the activity zone exceeds a predetermined deviation;
sending a navigation command in response to detecting the relocation event in order to autonomously reposition the vehicle so that a relative location of the target user is restored to the activity zone; and
maintaining the vehicle stationary when the relocation event is not detected.

13. The method of claim 12 further comprising the step of collecting a user defined parameter to map the activity zone.

14. The method of claim 13 wherein the user defined parameter includes an identification of a vehicle access point to be oriented toward the target user.

15. The method of claim 14 wherein the navigation command is configured to provide a predetermined alignment of the vehicle access point toward the target user.

16. The method of claim 13 wherein the user defined parameter is detected using a touchscreen configured to display a representation of the vehicle and to detect finger strokes for tracing the activity zone in relation to the displayed representation of the vehicle.

17. The method of claim 13 wherein the user defined parameter is detected using a portable wireless device configured to be carried by the target user in the exterior region and to signal the controller at selected locations in the exterior region to interactively map the activity zone.

18. The method of claim 12 wherein the predetermined deviation is comprised of the target user being out of the activity zone for more than a predetermined delay time.

19. The method of claim 12 further comprising the steps of F) determining a time-averaged relative position of the target user during a predetermined time window, and G) determining a destination for the navigation command that recenters a current location of the target user to a center of the activity zone.

20. The method of claim 12 wherein the detection of the relocation event occurs after the comparison of the monitored location of the target user to the activity zone exceeds the predetermined deviation for more than a predetermined delay time.

* * * * *